US006535956B1

United States Patent
Dodd et al.

(10) Patent No.: US 6,535,956 B1
(45) Date of Patent: Mar. 18, 2003

(54) METHOD AND APPARATUS FOR AUTOMATICALLY DETECTING WHETHER A BOARD LEVEL CACHE IS IMPLEMENTED WITH MCACHE

(75) Inventors: James M. Dodd, Citrus Heights, CA (US); Brian K. Langendorf, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/198,130

(22) Filed: Nov. 23, 1998

Related U.S. Application Data

(63) Continuation of application No. 08/528,699, filed on Sep. 15, 1995, now Pat. No. 5,898,856.

(51) Int. Cl.⁷ .............................................. G06F 12/00
(52) U.S. Cl. ........................ 711/118; 711/105; 711/106
(58) Field of Search .......................... 711/3, 105, 106, 711/118, 120, 130, 154, 168

(56) References Cited

U.S. PATENT DOCUMENTS

| 4,667,288 A | | 5/1987 | Keeley et al. | |
|---|---|---|---|---|
| 4,833,601 A | | 5/1989 | Barlow et al. | |
| 4,933,907 A | * | 6/1990 | Kumanoya et al. | ......... 365/222 |
| 4,939,695 A | * | 7/1990 | Isobe et al. | ................. 365/222 |
| 5,226,009 A | | 7/1993 | Arimoto | |
| 5,237,689 A | | 8/1993 | Behnke | |
| 5,301,278 A | | 4/1994 | Bowater et al. | |
| 5,307,320 A | | 4/1994 | Farrer et al. | |
| 5,355,201 A | * | 10/1994 | Hwang | ........................ 399/241 |
| 5,359,722 A | | 10/1994 | Chan et al. | |
| 5,421,000 A | | 5/1995 | Fortino et al. | |
| 5,444,652 A | | 8/1995 | Furuyama | |
| 5,457,659 A | | 10/1995 | Schaefer | |
| 5,459,686 A | | 10/1995 | Saito | |
| 5,459,798 A | * | 10/1995 | Bailey et al. | ............... 382/218 |
| 5,530,676 A | | 6/1996 | Sullivan et al. | |
| 5,535,394 A | | 7/1996 | Kasahara | |
| 5,537,351 A | | 7/1996 | Suwa et al. | |

OTHER PUBLICATIONS

Intel 823434LX/82434NX PCI, Cache and Memory Controller (PCMC), Dec. 1994.*

\* cited by examiner

*Primary Examiner*—Tuan V. Thai
(74) *Attorney, Agent, or Firm*—Blakely, Sokoloff, Taylor & Zafman LLP

(57) ABSTRACT

A mechanism for automatically detecting whether a selected type of cache memory is implemented within a cache memory element. The mechanism features a dedicated control line coupled between the cache memory element and a system controller. Logic circuitry is coupled to the control line to force the line to a first logic level in the event that the cache memory element has no connection to support the control line. However, if the cache memory element contains the selected type of cache memory, the logic circuitry is unable to for force the control line to go from a second logic level to the first logic level. After system reset, the system controller samples the voltage on the control line to determine whether the cache memory element is implemented with the selected type of cache memory.

24 Claims, 4 Drawing Sheets

METHOD AND APPARATUS FOR AUTOMATICALLY DETECTING WHETHER A BOARD LEVEL CACHE IS IMPLEMENTED WITH MCACHE

CROSS-REFERENCES TO RELATED APPLICATIONS

This is a continuation of a U.S. patent application (application Ser. No. 08/528,699) filed Sep. 15, 1995, which has matured into U.S. Pat. No. 5,898,856.

BACKGROUND OF THE INVENTION

1. Field of the Invention

The present invention relates to the field of cache memory. More particularly, the present invention relates to a mechanism for detecting what type of cache is implemented within a computer system.

2. Description of Art Related to the Invention

For many years, computer systems have been designed according to a standard architecture. This architecture includes a central processing unit ("CPU"), main memory, cache memory element, a system controller controlling data transfers to cache memory via a cache interface and interface logic which allows the computer system to receive information from external sources such as IDE hard drives, keyboards and the like. Well known in the art, "cache" is relatively small, fast memory, usually static random access memory ("SRAM"), in close proximity to the CPU. Cache memory stores copies of the contents of frequently used memory locations within main memory in order to accelerate computations by reducing the number of accesses to main memory.

Currently, there are two types of cache memory both of which are based on SRAM technology; namely, pipelined burst cache and asynchronous cache. Although these cache memories are widely used in electronic systems, pipelined burst cache has been more frequently implemented by computer manufacturers and/or highly technical computer users over the last few years. The reason is that pipelined burst cache is able to support burst cycles thereby providing faster data access than the asynchronous cache.

Typically, cache memory is implemented onto a "Cache On A Stick" ("COAST") module which is hardwired to a PC board. The COAST module is hardwired to the PC board because a Basic Input/Output System ("BIOS"), controlling the computer system during initialization, requires information as to which kind of cache is implemented within the computer system. Moreover, the reason for using the COAST module is to allow cache memory to be upgraded more easily without undergoing extensive modification the PC board.

In light of the continual advances in technology, it is contemplated that new types of cache memory, particularly pipelined burst cache, will be developed. One possible new type of cache memory, hereinafter referred to as "Mcache", includes dynamic random access memory ("DRAM") which requires refresh signals to avoid data loss. However, in the conventional cache interface, there does not exist any mechanism to detect whether conventional pipelined burst cache, Mcache or any other possible types of cache memory is implemented within the computer system. This leads to a number of disadvantages which effect both computer users and computer manufacturers alike.

One disadvantage is that the lack of any detect mechanism precludes computer users from upgrading their cache memories without overcoming a number of difficulties. For example, computer users would be required to know which type of cache is supported by his or her computer system prior to upgrading his or her cache. Moreover, the computer user would be required to reconfigure software, reset jumpers and perform other technical operations.

Another disadvantage effects the computer manufacturers by imposing further design constraints. With the emergence of multiple types of cache memory, the computer manufacturers would now be required to be even more cognizant of what type of cache is selected to populate computer boards for specific product lines to satisfy consumer needs. This further reduces design flexibility.

Thus, it would be advantageous to create a cache interface which can automatically discern what type of cache memory is implemented within the computer system to overcome those disadvantages cited above.

BRIEF SUMMARY OF THE INVENTION

The present invention relates to a mechanism to automatically detect whether cache memory is implemented with a selected type of cache memory different than conventional cache. The mechanism utilizes a unique interface including at least one cache detection signal line. The cache detection signal line propagates a cache detection signal from a cache memory element to a system controller. The cache detection signal is sampled after System Reset to determine whether the selected type of cache memory is implemented within the cache memory element.

BRIEF DESCRIPTION OF THE DRAWINGS

The features and advantages of the present invention will become apparent from the following detailed description of the present invention in which.

DETAILED DESCRIPTION OF THE INVENTION

An apparatus and method are described to enable a system controller to automatically detect the type of cache employed within a computer system. More particularly, whether a board level cache (e.g., a "L2 cache") of the computer system is implemented with Mcache as previously described. In the following detailed description, numerous specific details are set forth such as specific configuration of the cache interface which enables a system controller to detect the type of cache memory implemented within the computer system. It should be borne in mind that the present invention need not be limited to this specific configuration.

Figure 1:
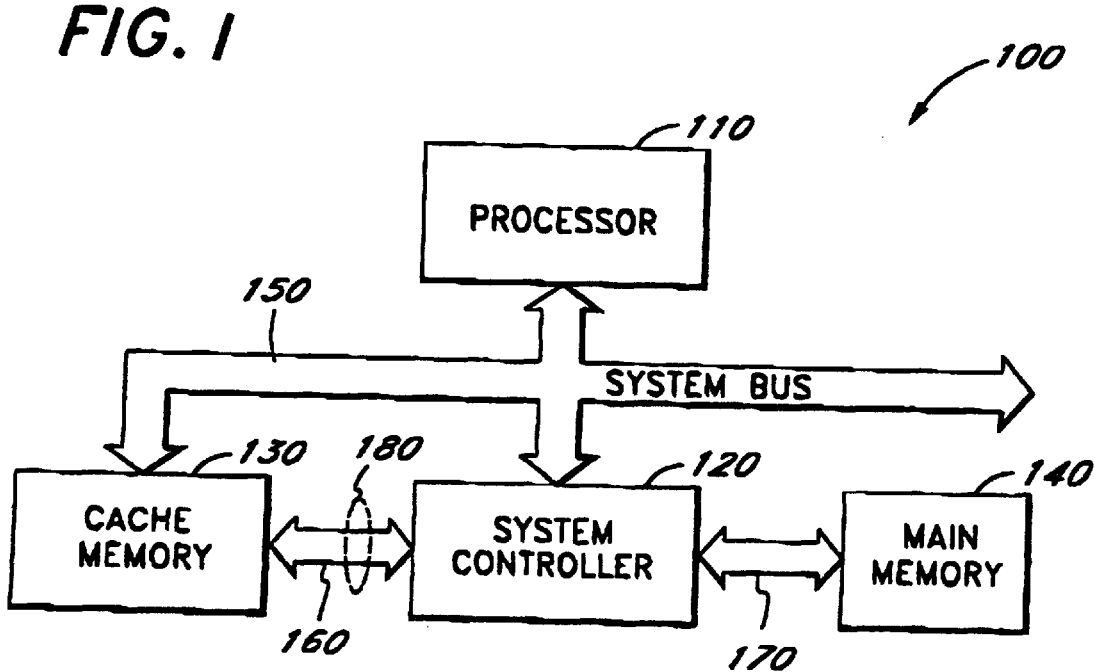
FIG. 1 is a simplified block diagram of a computer system comprising a processor, a system controller, a cache memory element and a main memory.

Referring now to FIG. 1, a simplified embodiment of a computer system 100 implementing the present invention is shown. The computer system 100 comprises a processor 110, a system controller 120, cache memory element 130 and main memory 140. The processor 110 and the system controller 120 are coupled to a system bus 150 to exchange data, address and control information. The cache memory element 130 is also coupled to the system bus 150 to receive control information from the processor such as an address strobe ("ADS#") signal. For this application, the symbol "#" following a signal name identifies the signal to be active-low.

As shown, the system controller 120 is further coupled to the cache memory element 130 via a first interconnect bus 160 and the main memory 140 via a second interconnect bus 170. This architecture enables the system controller 120, which includes a cache controller and a memory controller, to control data transfers between the cache memory element 130 and main memory 140. The first interconnect bus 160 is configured with a cache interface 180 enabling the system controller 120 to detect what type of cache memory is implemented within the cache memory element 130, such as, for example, whether Mcache or conventional pipelined burst SRAM is implemented therein.

Figure 2:
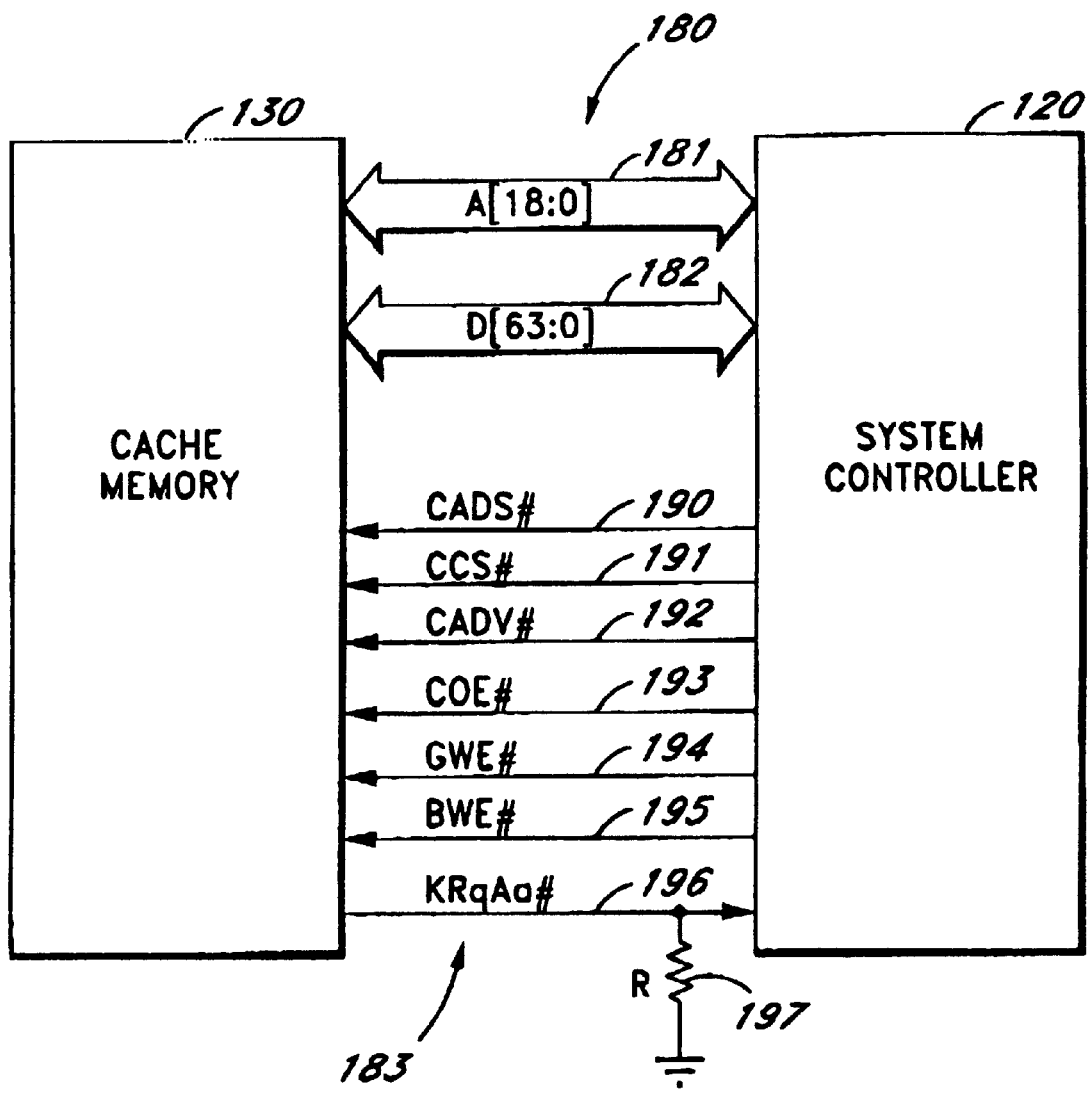
FIG. 2 is a block diagram featuring one embodiment of the cache interface between the cache memory element and the system controller of FIG. 1.

Referring now to FIG. 2, an embodiment of the cache interface of FIG. 1 is illustrated. The cache interface 180 includes a plurality of address lines 181, data lines 182 and control lines 183, all of which are used to support data transfers between the system controller 120 and the cache memory element 130. As shown, the address lines 181 are configured to support cache memory ranging in size up to 512 kilobytes, although larger cache memory may be supported by altering the address line reconfiguration. The data lines 182 are bi-directional enabling the system controller 120 and the cache memory element 130 to transmit or receive up to sixty-four bits of data (i.e., a 8 byte data word) in parallel.

In addition, most of the control lines 183 shown are well known in the art. Namely, the control lines 183 of the cache interface 180 support a cache address strobe ("CADS#") signal, a cache chip select ("CCS#") signal, a cache advance ("CADV#") signal, a cache output enable ("COE#") signal, a global write enable ("GWE#") signal and a byte write enable ("BWE#") signal. These control signals operate as follows.

If the processor requires data stored within the computer system, it issues a request for data by transmitting an address of the data and asserting an address strobe ("ADS#") signal to the system controller 120 and the cache memory element 130. Both the cache memory element 130 and the cache controller (not shown), employed within the system controller, sample the ADS# signal and if asserted, initiate a cache cycle. Thereafter, the system controller 120 determines whether the requested data is stored in the cache memory element 130, and if the requested data is stored in cache memory element 130, the COE# signal (via control line 193) is asserted which allows the cache memory element 130 to drive data back to the processor along the data bus 182. The CADS# signal, propagated through a control line 190, is provided as a mechanism by which the cache-controller, employed within the system controller 120, can generate cache cycles to the cache memory without the processor having to assert the ADS# signal.

To enable operations to be performed by the cache memory element 130, the CCS# signal is asserted via control line 191. If the CCS# signal is asserted and the cache memory element 130 is preferably pipelined burst cache, the CADV# signal is asserted through control line 192 to cause the cache memory element 130 to internally increment the address which is sampled with the ADS# or CADS# signal to point to the next sequential data word. For Pentium®-based computer systems, a data word is typically 64-bits in size. To facilitate writing data into the cache memory, the GWE# and BWE# signals are used. To appropriately select how many bytes of the addressed data word are to be written into the cache memory element 130, the cache interface 180 includes a global write enable line 194 which transfers the GWE# signal thereby forcing all bytes (e.g., 8-bytes for a Pentium®-based computer system) of the addressed data word to be written into the cache memory element 130. Likewise, the cache interface 180 includes a byte write enable line 195 propagating the BWE# signal which, when combined with byte enables from the processor, allows a selected number of bytes of the data word to be written.

More specific to the present invention, the cache interface 180 includes a bi-directional control 196 line from the cache memory element 130 to the system controller 120. The control line 196 propagates a cache detection signal ("KRqAa" signal) which indicates to the system controller 120 whether or not the Mcache is implemented within the cache memory. A pull-down resistor 197, with a small amount of resistance in the order of approximately less than 50 kilo-ohms ("KΩ") is coupled to the control line 196 to signal the system controller 120 through a grounded signal that Mcache is not implemented within the cache memory element 130. However, if the cache detection signal is logic "high", it indicates that Mcache is implemented within the cache memory element 130. It is contemplated that other components may be employed in lieu of the pull-down resistor in order to achieve the same objective. For example, a pull-up resistor may be used, provided a "low" logic indicates Mcache is implemented.

Figure 3A:
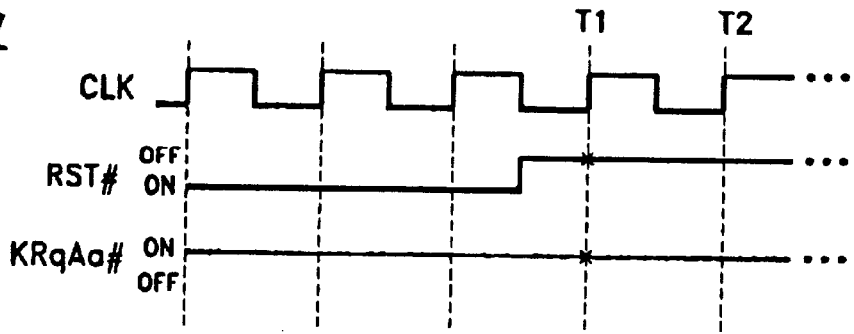
FIGS. 3a and 3b are timing diagrams illustrating the cache detection signal which, when deasserted, indicates that the cache memory element is configured with Mcache and indicates that the cache memory element is configured with conventional cache when the cache detection signal is asserted.
Figure 3B:
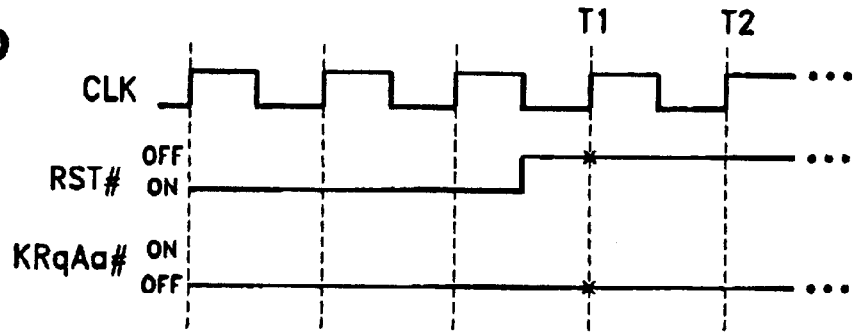

Referring to FIGS. 3a and 3b, a general timing diagrams of the operations of the cache detection signal are shown. When the computer system is powered-up or reset, the computer system asserts a system-wide reset ("RST#") signal. Generally, the RST# signal places every component in a quiescent stable state and maintains these components in this state for approximately one millisecond being a sufficient time for signal stabilization. After the RST# signal is deasserted, the system controller samples the cache detection signal ("KRqAa#") at a rising edge of a system clock ("CLK") to determine whether the cache detection signal is asserted or deasserted.

As shown in FIG. 3a, if the system controller samples the cache detection signal at the rising clock edge of the system clock at T1 and detects the cache detection signal to be deasserted (or logic "high"), it is determined that Mcache is implemented within cache memory. However, as shown in FIG. 3b, if the system controller samples the cache detection signal to be asserted (or logic "low") at the rising clock edge of the system clock, the cache memory is not implemented with Mcache. It is contemplated that the sampling may be triggered at the falling edge of the system clock or through a non-edge sensitive technique.

Figure 4:
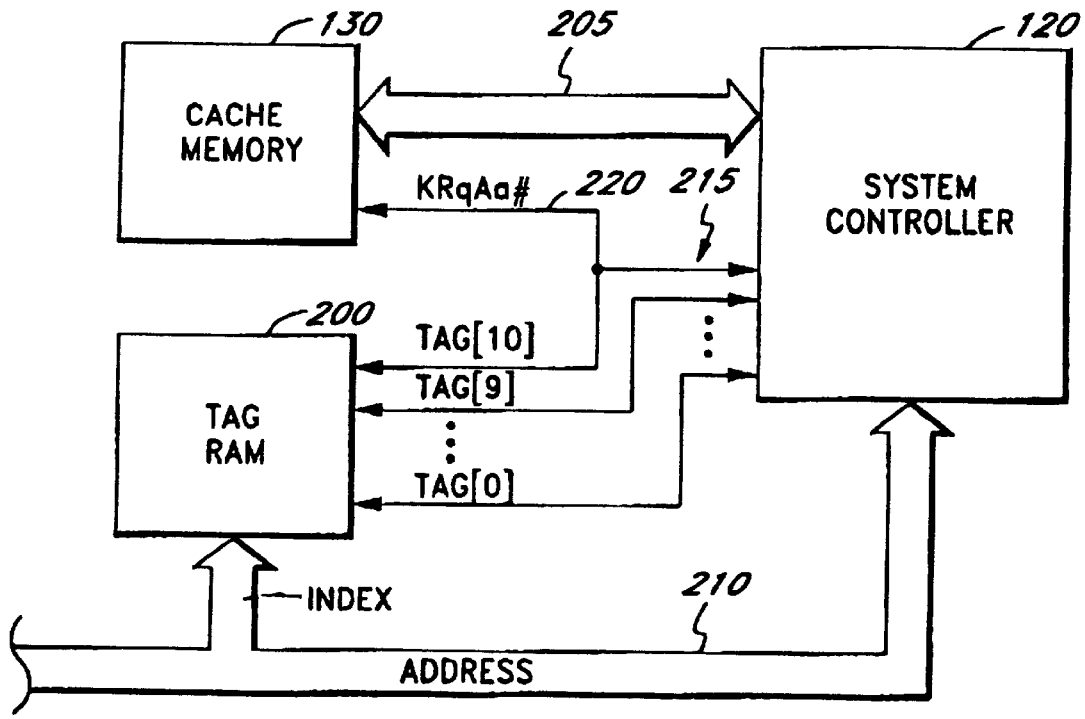
FIG. 4 is a block diagram illustrating a second embodiment supporting a cache detection signal.

Referring now to FIG. 4, another embodiment in implementing a cache detection control line is shown. As previously mentioned, the system controller 120 transmits information to the cache memory element 130 via bus lines 205. More specifically, the system controller 120 operates as a cache controller by determining whether data is stored in cache memory element 130 or main memory 140. This is performed through Tag RAM 200 which operates as a lookup table. The Tag RAM 200 receives an index of the address propagating through address lines 210 to access a memory location in Tag RAM 200. The index is the number of bits from predetermined bit locations of the address. In this embodiment, address A[18:5] are used as the index. The contents of the memory location are propagated through the tag data lines ("TAG[10:0]") 215 to the cache controller. If these contents are compared to a selected bits of the address and if there is a match, the requested data is stored in the cache memory element 130.

As shown, if eleven (11) address bits are dedicated for tag purposes, the computer system is capable of supporting 512 megabytes ("MB") of DRAM. However, for computer systems configured with less than 512 MB of DRAM, the upper tag bit of the tag address are not being used. For example, a system which allows for 64 MB of "cacheable" DRAM, only 8 tag-bits are required. Therefore, the tag line associated with the most significant tag bit ("TAG[10]") could be disconnected from a preselected pin of the system controller 120 at node A by the Basic Input/Output System ("BIOS"). Instead, a control line 220 may be coupled to the preselected pin to propagate the cache detection signal ("KRqAa#") into the system controller 120 as shown. Thus, the system controller 120 could be designated without a new pin configuration.

Figure 5:
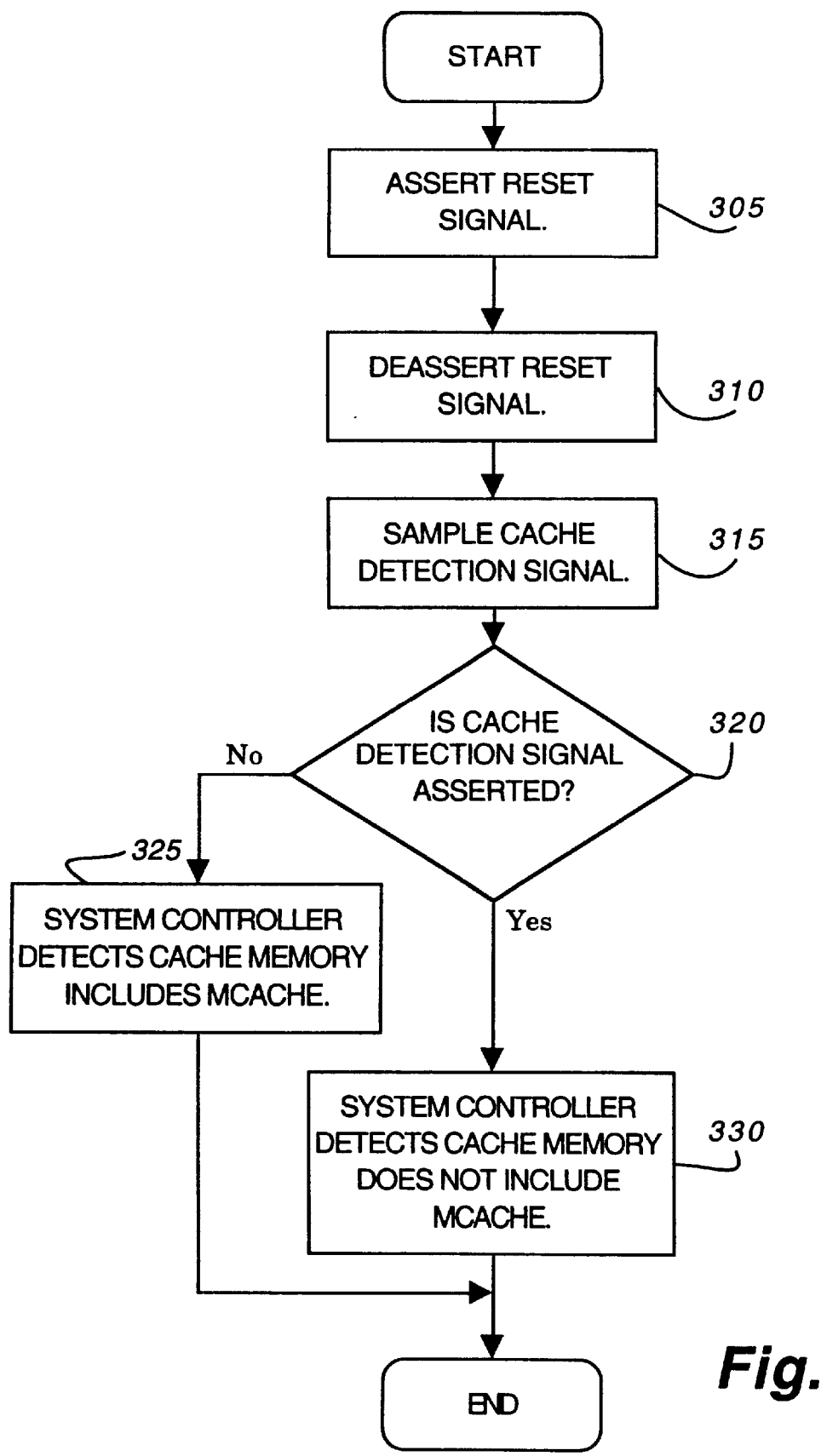
FIG. 5 is a flowchart illustrating the operational steps needed to automatically detect a selected type of cache, such as Mcache, being implemented within a cache memory element.

Referring to FIG. 5, a flowchart illustrates the operational steps observed by the present invention is shown. First, in block 305, the computer is placed into reset by asserting the RST# signal by power-on the computer system, depressing <control> <alt> and <delete> keys simultaneously and the like. In block 310, after the RST# signal is deasserted, the cache detection signal is sampled by the system controller on the next rising clock edge of the system clock or any other predetermined time period. If the cache detection signal is deasserted, the cache memory is implemented with Mcache requiring the system controller to consistently transmit a refresh signal, preferably through a control line utilized by the cache detection signal, with a given frequency to refresh Mcache (blocks 315, 320 and 325). Otherwise, the cache memory, if implemented, is configured with conventional SRAM allowing the system controller to operate as usual (blocks 315, 320 and 330).

The present invention described herein may be designed in many different methods and using many different configurations. While the present invention has been described in terms of various embodiments, other embodiments may come to mind to those skilled in the art without departing from the spirit and scope of the present invention. The invention should, therefore, be measured in terms of the claims which follow.

What is claimed is:

1. In communication with a cache memory element for implementation with a computer system, a system controller to (i) sample a cache detection signal on a control line coupled to the cache memory element after a System Reset of the computer system, (ii) determine after the System Reset that memory refresh signaling is needed for a selected type of memory placed within the cache memory elements when the sampled cache detection signal is in a first state, and (iii) determine after the System Reset that no memory refresh signaling is needed when the sampled cache detection signal is in a second state.

2. The system controller of claim 1, wherein the cache memory element comprises a cache controller coupled to at least one pin of the system controller via the control line.

3. The system controller of claim 2, wherein a pull-down resistor is coupled to the control line so that, after the System Reset, the cache detection signal is deasserted when the cache memory element is implemented with dynamic random access memory requiring the memory refresh signal to avoid data loss.

4. The system controller of claim 3, wherein after the System Reset, the cache detection signal is asserted when the cache memory element is implemented with static random access memory.

5. The system controller of claim 3, wherein the at least one pin is coupled to an interconnect bus that comprises a plurality of control lines including the control line.

6. The system controller of claim 5, wherein the plurality of control lines further provide a communication path for at least one of a cache address strobe signal and a cache chip select signal.

7. The system controller of claim 5, wherein the plurality of control lines further provide a communication path for a cache advance signal.

8. The system controller of claim 5, wherein the plurality of control lines further provide a communication path for at least one of a cache output enable signal, a global write enable signal, and a byte write enable signal.

9. The system controller of claim 2, wherein a pull-up resistor is coupled to the control line so that, after the System Reset, the cache detection signal is asserted when the cache memory element is implemented with dynamic random access memory requiring the memory refresh signal to avoid data loss.

10. A system controller configured for controlling a data transfer between a processor and a cache memory element, the system controller comprising:

first interface means for exchanging information with the processor; and second interface means for sampling at least one cache detection signal on a control line directly coupled to the cache memory element to detect, after resetting a computer system employing the system controller, whether the cache memory element is implemented with a selected type of cache memory requiring memory refresh signaling and whether the selected type of cache memory lacks dependency of memory refresh signaling.

11. The system controller of claim 10, wherein the control line of the second interface means includes a passive component for placing the cache detection signal at a predetermined logic level if the cache memory element is not implemented with the selected type of cache memory.

12. The system controller of claim 11, wherein the passive component includes a pull-down resistor.

13. The system controller of claim 10, wherein the cache detection signal, when deasserted after resetting the computer system, indicates that the selected type of cache memory is made of dynamic random access memory.

14. The system controller of claim 13, wherein the cache detection signal, when asserted after resetting the computer system, indicates that the selected type of cache memory is made of static random access memory.

15. A computer system comprising:

a cache memory element;

an interconnect bus including a plurality of control lines; and a system controller coupled to the cache memory element via the interconnect bus, the system controller to sample a cache detection signal on a first control line of the plurality of control lines after a System Reset and to detect (i) whether a selected type of cache memory implemented within the cache memory element requires signaling memory refresh signaling, and (ii) whether the selected type of cache memory does not require memory refresh signaling.

16. The computer system of claim 15 further comprising a passive component coupled to the cache detection control line, the passive component to place the cache detection signal at a first logic level if the cache memory element is implemented with static random access memory that does not require memory refresh signaling.

17. The computer system of claim 16, wherein the passive component includes a pull-down resistor.

18. The computer system of claim 16, wherein the passive component to place the cache detection signal at a second logic level, differing from the first logic level, if the cache memory element is implemented with the select type of cache memory that requires memory refresh signaling.

19. A method comprising:

establishing communications between a controlling device and a cache memory element employed with a computer system; and after System Reset of the computer system, sampling a state of a cache detection signal on a control line between the controlling device and the cache memory element, the state of the cache detection signal to indicate to the controlling device at least one of (i) memory refresh signaling is needed by the cache memory element and (ii) no memory refresh signaling is needed by the cache memory element.

20. The method of claim 19, wherein prior to the sampling of the state of the cache detection signal, the method further comprises placing the cache detection signal in a first state to indicate that the cache memory element is a type of memory requiring the memory refresh signaling.

21. The method of claim 20, wherein prior to sampling of the state of the cache detection signal, the method further comprises placing the cache detection signal in a second state to indicate that the cache memory element is a static random access memory having no need of memory refresh signaling.

22. A cache interface comprising:

a plurality of address lines; and a control line adapted between a controller and a cache memory element to sample a cache detection signal after a System Reset and to detect (i) whether a selected type of cache memory implemented within the cache memory element requires signaling memory refresh signaling, and (ii) whether the selected type of cache memory does not require memory refresh signaling.

23. The cache interface of claim 22, wherein the control line is placed in a first logic level if the cache memory element is Mcache.

24. The cache interface of claim 23, when the Mcache includes dynamic random access memory requiring refresh.

* * * * *